UNITED STATES PATENT OFFICE.

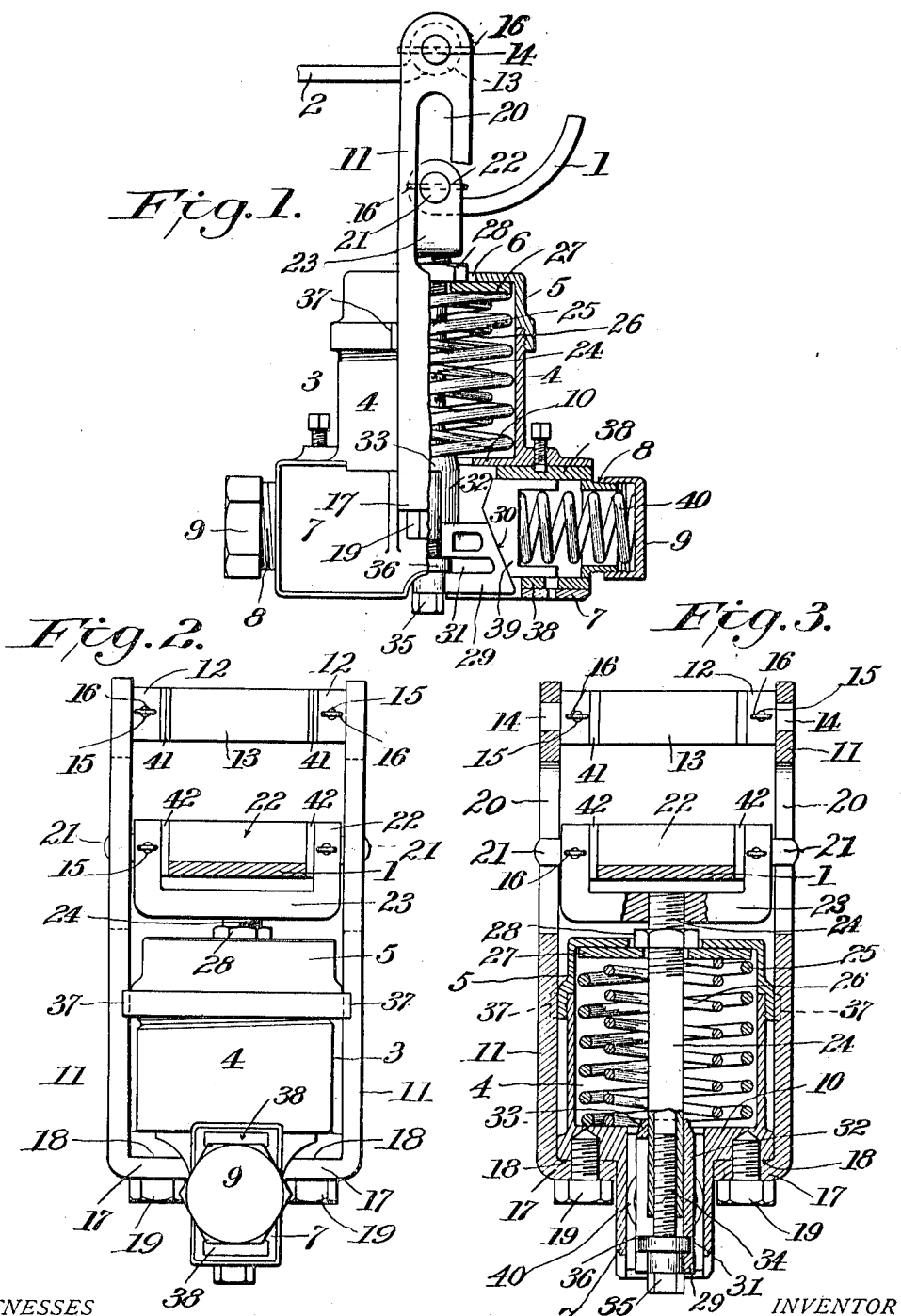

CHARLES T. SCHOEN, OF MEDIA, PENNSYLVANIA.

SHOCK-ABSORBER FOR VEHICLES.

1,035,913.     Specification of Letters Patent.     Patented Aug. 20, 1912.

Application filed November 6, 1911. Serial No. 658,722.

*To all whom it may concern:*

Be it known that I, CHARLES T. SCHOEN, a citizen of the United States, residing at Media, in the county of Delaware and State of Pennsylvania, have invented a certain new and useful Improvement in Shock-Absorbers for Vehicles, of which the following is a full, clear, and exact description.

The object of the invention is to provide a shock absorber spring by which the effects of the shocks will be greatly reduced, if not entirely eliminated, in automobiles and other vehicles, when running over rough or comparatively rough roads, and so constructed that it will not interfere with the free and easy action of the springs when running on smooth roads, whereby the comfort of the occupants of the vehicle is greatly enhanced; and further to effect an economy in the wear upon the tires of the vehicle and also to gain a more effective result of the motive power and saving of loss of power by maintaining the wheels in contact with the road upon which the vehicle is being propelled; and further, to provide such a resilient-like connection between the members of the spring as to protect them from breakage.

The invention consists in a shock absorber for connecting the upper and lower members of vehicle springs, in which there is a main spring for absorbing the shocks vertically between said spring members, and an auxiliary spring or cushioning device arranged in the line of action of and transversely with relation to the main spring for retarding the rebound of the springs, all substantially as I will proceed now more particularly to set forth and finally claim.

In the accompanying drawings, illustrating the invention, in the several figures of which like parts are similarly designated, Figure 1 is a side elevation, partly in section. Fig. 2 is an end elevation, and Fig. 3 is a central vertical section.

1 and 2 are the upper and lower members, respectively, of the elliptic spring, the upper member 1 being adapted to be secured to the body of the vehicle, and the lower member 2 being adapted to be fixed upon the axle of the vehicle in any approved manner.

3 is a metallic case comprising the upwardly extending cylindrical portion 4 open at its upper end and provided with a cap 5 screwthreaded thereon and having a central opening 6. Projecting from opposite sides of the casing 3 below the cylindrical portion 4, are substantially rectangular chambers 7, 7, opening at their outer ends into cylindrical screwthreaded bosses 8, 8, adapted to receive screwthreaded caps or nuts 9, 9.

10 is a flange projecting inwardly at the bottom of the cylindrical portion 4 of the casing, to afford a support for the springs to be referred to.

11, 11 are links having embossments 12, 12, loosely connected at their upper ends to the knuckle 13 of the lower member of the spring by means of a pin 14 passing through the knuckle and embossments, the said embossments and pin being provided with holes 15 to receive cotter pins 16 or other suitable fastenings. The links 11 are bent inwardly at their lower ends as at 17, and are adapted to engage seats 18 formed therefor on the casing and are secured in place by screws 19. These links, it will be observed, constitute supports for the casing for rigidly connecting and supporting the casing from the lower member of the elliptic spring. The links 11 are also provided with slots 20 extending from the top of the casing to about the knuckle of the lower member of the spring. These slots 20 are adapted to receive and guide the ends of the pin 21 engaging the knuckle 22 of the upper member 1 of the elliptic spring. Also connected with the pin 21 of the upper member of the elliptic spring is a yoke 23, and connected to said yoke about centrally thereof is a rod 24, extending through the opening 6 in the cap 5 and down into the casing, and passing through the coils of a vertical spring 25 and a supplemental vertical spring 26, the said springs being arranged within the casing and resting upon the inwardly projecting flange 10 at the bottom of the cylindrical portion 4 thereof, and held in said casing by the cap 5.

Arranged between the cap 5 and the upper coils of the springs 25 and 26 is a follower plate 27, said follower plate being engaged by a nut 28 screwthreaded and capable of adjustment upon the rod 24 and freely entering the opening 6 in the cap 5.

Adjustably and removably secured to the lower end of the rod 24 is a vertical wedge, comprising the head 29 having the inclined or beveled sides 30 and the open-sided slots 31. The wedge is also provided with the open-sided shank 32, terminating in a collar 33 for encircling the rod 24. In order to removably and adjustably secure the wedge to the rod, the lower end of the rod is provided with a screwthreaded bore 34 adapted to receive a screw 35 having a flange 36 adapted to engage the open-sided slots 31 in the head 29 of the wedge.

The cap 5 is preferably provided with lips 37 for engaging the links 11 to more firmly secure the parts in place.

Secured in the rectangular chambers 7 upon opposite sides of the casing are gibs or guides 38 to afford seats or bearing surfaces for horizontally or transversely sliding wedges 39 arranged transversely to the line of action of the springs 25 and 26 and backed up by springs 40 passed into the chambers 7 through the open ends thereof and held in place and capable of having their tension adjusted by the screwthreaded caps 9. The horizontally or transversely sliding wedges 39 have their inclined or wedge faces forced into engagement with the inclined or beveled faces of the vertical wedge 29 by the springs 40.

Suitable washers 41 and 42 may be provided between the connections with the links 11 and yoke 23 with their respective spring knuckles to provide for variations in the width of the springs 1 and 2.

The operation of the device is as follows:—The vehicle body being supported on the curved end of the upper member of the elliptic spring which is attached to the vertical rod 24, the pressure is transmitted to the springs 25—26 by means of the nut 28 acting upon the follower plate 27. The load so imposed is supported in turn by the links 11 being attached to the lower member of the elliptic spring and to the under-part of the casing 3. The load thus causes the compression of the springs 25—26 and also causes the wedge 29—30 on the lower end of the rod 24 to slide down, thus relieving the horizontal or transverse springs 40 and their wedges 39 which are still under compression, and the horizontal or transverse springs 40 and their wedges travel outward against the vertical wedge, and when a severe concussion occurs, the rod 24 draws up the vertical wedge and compresses the horizontal springs 40, thereby resisting or retarding the undue upward movement of the rod and its attached wedge. In ordinary travel on comparatively good roads, the vertical springs in addition to supporting the load, vibrate very rapidly and thus absorb the ordinary jars, the horizontal springs acting but slightly until severe shocks occur.

As above stated, the upper member 1 of the elliptic spring is attached to the body of the vehicle and in accordance with this invention the movable part of the device, that is to say, the vertically movable wedge 29—30 and vertical springs 25—26 are connected to the upper member of the elliptic spring, and the stationary part of the device, that is to say, the casing 3 and its contained horizontal springs 40 and wedges 39 are connected to the lower member 2 of the elliptic spring, and when the vehicle is in motion, the vertical springs receive the shock of the impact, and as the vibrations or impulses in them are much more frequent than in the elliptic springs, they absorb and minimize the unpleasant effect of the jolting of the vehicle, and when a severe rebound occurs, it is retarded gradually by the vertical wedge acting upon the horizontally or transversely sliding wedges and their springs. The horizontal springs and wedges are but slightly in action, excepting when required by a sudden rebound.

Aside from the enhancement of the comfort of the occupants of the vehicle, due to this construction, economy in wear upon the tires is greatly effected, and the effective power of the motor for propelling the vehicle is increased, because the wheels are not liable to be lifted out of contact with the ground. This lifting of the wheels occurs frequently at high speed, and as the wheel, being free from the ground, will be spun at a high velocity, and thus injure the tire when it comes suddenly in contact with the ground, and, furthermore, considerable loss of power is occasioned by such lifting of the wheels.

A further advantage of this invention is that it provides a resilient-like connection between the upper and lower members of the elliptic spring, and the resiliency is such as to protect them from breakage.

I wish to be understood as not limiting my invention to the exact details of construction herein shown and described, as the same may be altered in various particulars without departing from the spirit and scope of the invention.

What I claim is:—

1. A shock absorber for vehicles, for use in connection with the vehicle springs, comprising essentially a main spring, means for connecting its opposite ends with the vehicle spring members and adapted to receive the shocks of ordinary travel of the vehicle, an auxiliary cushioning device arranged transversely to the line of action of the main spring, and means interposed between said main spring and auxiliary cushioning device to permit the free action of the main spring during the ordinary travel of the vehicle and to effect a retarding of the rebound of the vehicle spring upon the occurrence of severe shocks.

2. A shock absorber, for use on vehicle springs, comprising essentially a main spring, means to connect opposite ends of said main spring with the vehicle spring so as to compress said main spring as load is imposed on the vehicle spring, auxiliary spring cushioning devices arranged transversely to the line of action of the main spring, and means interposed between the main spring and the auxiliary springs to transmit the motion of the main spring to said auxiliary springs as said main spring expands and thereby put the auxiliary springs under compression, so that as the vehicle rebounds and the main spring suddenly relaxes, the auxiliary springs act to retard the rebound.

3. In a shock absorber for vehicles, the combination with the upper and lower members of an elliptic spring, of a casing supported by the lower member of said elliptic spring, a vertical spring arranged in said casing, a rod connecting said vertical spring with the upper member of said elliptic spring, a wedge secured to the lower end of said rod and vertically movable with said rod, transversely sliding wedges arranged in said casing, and springs in said casing for forcing said transversely sliding wedges into engagement with the vertically movable wedge.

4. In a shock absorber for vehicles, the combination with the upper and lower members of an elliptic spring, of a casing supported by the lower member of said elliptic spring, a vertical spring in said casing, a rod connecting said vertical spring with the upper member of said elliptic spring, an adjustable wedge secured to the lower end of said rod, transversely sliding wedges arranged in said casing, and springs for forcing said transversely sliding wedges into engagement with said adjustable wedge.

5. In a shock absorber for vehicles, the combination with the upper and lower members of an elliptic spring, of a casing, links for supporting said casing from the lower member of said elliptic spring and provided with slots, vertical springs arranged in said casing, a follower plate in said casing engaging the upper ends of said vertical springs, a rod passing through said springs and follower plate and connected to the upper member of said elliptic spring and guided by the slots in said links, an adjusting nut on said rod engaging said follower plate, an adjustable wedge secured to the lower end of said rod, transversely sliding wedges arranged in said casing, and springs in said casing for forcing said transversely sliding wedges into engagement with said adjustable wedge.

6. In a shock absorber for vehicles, the combination with the upper and lower members of an elliptic spring, of a casing comprising a vertical cylindrical portion and rectangular portions projecting from opposite sides of said cylindrical portion, links for supporting said casing from the lower member of said elliptic spring, vertical springs arranged in the vertical cylindrical portion of said casing, a follower plate arranged at the top of said cylindrical portion and engaging the upper ends of said vertical springs, a rod for connecting said vertical springs with the upper member of said elliptic spring, an adjusting nut on said rod and engaging said follower plate, an adjustable wedge secured to the lower end of said rod, transversely sliding wedges arranged in the rectangular portions of said casing, and springs arranged in said rectangular portions of said casing to force said transversely sliding wedges into engagement with said adjustable wedge.

7. In a shock absorber for vehicles, the combination with the upper and lower members of an elliptic spring, of a casing having a vertical cylindrical portion and horizontal rectangular portions projecting from opposite sides of said cylindrical portion, vertical springs arranged in said cylindrical portion, a follower plate arranged in said casing and engaging the upper ends of said vertical springs, a rod for connecting said vertical springs with the upper member of said elliptic spring, an adjusting nut on said rod for engaging said follower plate, an adjustable wedge on the lower end of said rod and arranged intermediate said rectangular portions of the casing, horizontally sliding wedges arranged in said rectangular portions, horizontal springs arranged in said rectangular portions for forcing said horizontally sliding wedges into engagement with said adjustable wedge, and adjustable screw-threaded caps for said rectangular portions engaging said horizontal springs.

8. In a shock absorber for vehicles, the combination with the upper and lower members of an elliptic spring, of a casing comprising a vertical cylindrical portion and horizontal rectangular portions projecting from opposite sides of said cylindrical portion, vertical springs arranged in said cylindrical portion, a follower plate arranged in said casing and engaging the upper ends of said vertical springs, a rod for connecting said vertical springs with the upper member of said elliptic spring, an adjusting nut on said rod engaging said follower plate, an adjustable wedge on the lower end of said rod, guides fitted in said rectangular portions, horizontally sliding wedges engaging said guides, horizontal springs in said rectangular portions for forcing said horizontally sliding wedges into engagement with said adjustable wedge, and adjustable screw caps fitted on said rectangular portions for engaging said horizontal springs.

In testimony whereof I have hereunto set my hand this 2nd day of November A. D. 1911.

CHARLES T. SCHOEN.

Witnesses:
T. W. BROOM,
ROBERT I. SMITH.